United States Patent [19]

Patterson et al.

[11] Patent Number: 4,735,999

[45] Date of Patent: Apr. 5, 1988

[54] POLYAMIDE REINFORCED POLYCARBONATE-POLYDIORGANOSILOXANE COMPOSITION

[75] Inventors: Dwight J. Patterson, Evansville; Kenneth F. Miller, Mt. Vernon, both of Ind.

[73] Assignee: General Electric Company, Mt. Vernon, Ind.

[21] Appl. No.: 945,739

[22] Filed: Dec. 23, 1986

[51] Int. Cl.$^4$ .............................................. C08L 83/10
[52] U.S. Cl. ..................................... 525/431; 525/433
[58] Field of Search ............... 525/431, 433, 464, 467, 525/474

[56] References Cited

U.S. PATENT DOCUMENTS 4,387,193  6/1983  Giles, Jr. .............................. 525/431
4,616,042 10/1986  Avakian ................................ 521/81

Primary Examiner—Theodore E. Pertilla
Attorney, Agent, or Firm—Martin B. Barancik

[57] ABSTRACT

A composition comprising a polycarbonate polydiorganosiloxane random block copolymer reinforced with an effective reinforcing amount of a polymeric aromatic amide in a physical form which achieves reinforcement.

5 Claims, No Drawings

POLYAMIDE REINFORCED POLYCARBONATE-POLYDIORGANOSILOXANE COMPOSITION

BACKGROUND OF THE INVENTION

The polycarbonates are a well known polymer family useful in applications wherein toughness, impact resistance, temperature resistance and electrical properties, among others, are significant. It is also a well known fact that the glassy polymers such as polycarbonates, can be readily reinforced so as to obtain a higher modulus and tensile strength among other properties with reinforcing materials such as glass, ceramics, asbestos, silica, mica, carbon/graphite, and the like. The forms which these reinforcing materials can take include fibers, mats, flakes, whiskers, and in general any form which provides reinforcement to the polycarbonate. However, when the polycarbonates are reinforced with these materials, generally certain property advantages are substantially lessened. Among these and perhaps the most significant is the impact strength and elongation of the polycarbonate. It is well known that the addition of glass fibers to polycarbonates increases the modulus and tensile strength of the polycarbonate composition significantly while concurrently sharply reducing the impact strength of the polycarbonate. In some instances the impact strength of the composition can be retained to a great extent by adding a third compatibilizing component. For example in U.S. Pat. No. 3,640,943, Bostick, et al, issued to General Electric Company, the addition of a relatively small quantity of a polycarbonate polydimethylsiloxane block copolymer to a composition of polycarbonate and glass fiber, or coating the glass fibers with the polycarbonate polysiloxane block copolymer and then adding substantial quantities of polycarbonate brings about a final composition with significant levels of impact resistance.

However, there still remains a need for preparing reinforced polycarbonate or polycarbonate like compositions which maintain a significant quantity of the polycarbonate like characteristics to a substantial extent.

It has now been found that a specific type of polycarbonate copolymer resin can be reinforced with a certain kind of reinforcing material and still retain virtually all of the impact resistance known for the components of the composite system.

BRIEF DESCRIPTION OF THE INVENTION

In accordance with the invention there is a composition comprising a random block copolymer of polycarbonate polydiorganosiloxane reinforced with an effective reinforcing amount of a polymeric aromatic amide in a physical form which achieves reinforcement.

DETAILED DESCRIPTION OF THE INVENTION

The polycarbonate polydiorganosiloxane random block copolymers useful in this composition are included in the disclosure of U.S. Pat. No. 3,189,662, issued to Vaughn and assigned to General Electric Company. This patent is incorporated by reference in its entirety. The block copolymers have been utilized in various applications as observed in U.S. Pat. No. 4,027,072 and U.S. Pat. No. 4,123,588, issued to Molari and assigned to General Electric Company. Both of these U.S. patents are incorporated by reference into the application.

The polysiloxane polycarbonate block copolymers can be expressed by the average formula:

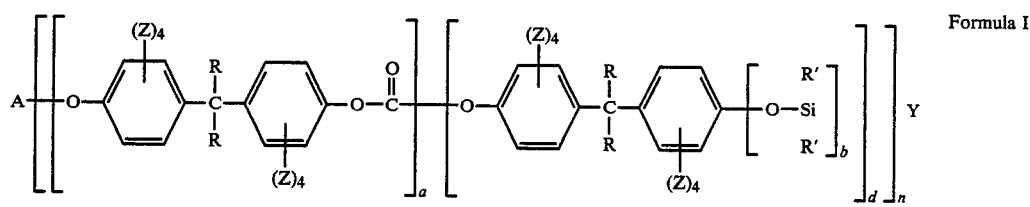

Formula I where n is at least 1, and preferably n is an integer equal to from 1 to about 1000, inclusive, a is equal to from 1 to about 200, inclusive, b is equal to from about 5 to about 200, inclusive, and preferably b has an average value from about 8 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, y is

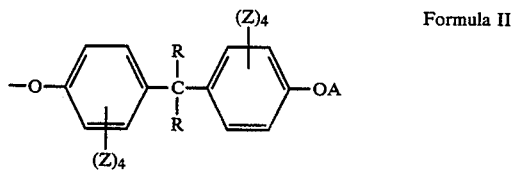

Formula II

A is a member selected from the class of hydrogen and

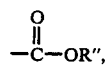

each R is independently a member selected from the class of monovalent hydrocarbon radicals and halogenated monovalent hydrocarbon radicals, each R' is independently a member selected from the class of monovalent hydrocarbon radicals, halogenated monovalent hydrocarbon radicals and cyanoalkyl radicals, R'' is a member selected from the class consisting of monovalent hydrocarbon radicals and halogenated hydrocarbon radicals, and each Z is independently a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc., radicals. Radicals that are included within the definition of Z of Formula I are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10 to about 75% of said polydiorganosiloxane, and preferably from about 40 to 70% by weight.

The copolymers of Formula I can be produced by reacting at temperatures in the range of 0° to 100° C., preferably 20° to 50° C., and in the presence of an acid acceptor, a mixture of a halogen chain stopped polydiorganosiloxane having the formula

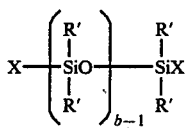

Formula III and a dihydric phenol having the formula

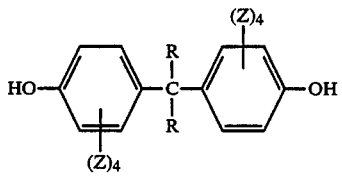

Formula IV and thereafter phosgenating said reaction product with or without additional dihydric phenol until the resulting copolymer achieves a maximum intrinsic viscosity, where R, R', Z and b are as defined above, and X is a halogen radical, preferably chloro.

The halogen chain stopped polydiorganosiloxanes of Formula III can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain stopped polysiloxane are not critical, generally it has been found desirable to maintain the halogen content of the resulting halogen chain stopped polysiloxane in the range of about 0.4 to about 35%, by weight, and preferably from about 1 to about 10% by weight of said halogen chain stopped polysiloxane. The halogen chain stopped polysiloxane is preferably in the form of a chlorinated polydimethylsiloxane.

Dihydric phenols that are included in Formula IV are, for example, 2,2-bis(4-hydroxyphenyl)propane (bisphenol-A); 2,4'-dihydroxydiphenylmethane; bis-(2-hydroxyphenyl)methane; bis-(4-dihydroxyphenyl)methane; 1,1-bis(4-hydroxyphenyl)ethane; 1,2-bis(4-hydroxyphenyl)ethane; 1,1-bis(4-hydroxy-2-chlorophenyl)ethane; 1,1-bis(2,5-dimethyl-4-hydroxyphenyl)ethane; 1,3-bis(3-methyl-4-hydroxyphenyl)propane; 2,2-bis(3-isopropyl-4-hydroxyphenyl)propane, etc. Mixtures can also be used. Others will occur to those skilled in the art.

The copolymers of the present invention essentially comprise recurring units consisting of a polydiorganosiloxane interconnected by substituted aryloxy silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular desired characteristics.

The aromatic amide materials useful in this application are generally derived from an aromatic diacid such as terephthalic acid, isophthalic acid, phthalic acid, naphthalene diacid, and the like and aromatic diamines such as metaphenylenediamine, paraphenylenediamine, 1,6-naphthalenediamine, and the like. Aromatic amide polymers which are useful in this invention are prepared and sold commercially by DuPont under the trademark KEVLAR ® resin and NOMEX ® resin. KEVLAR ® is the monomeric repeating units of terephthalic acid and 1,4-phenylenediamine. The form of the aromatic amide polymer should be any form which reinforces the polycarbonate polydiorganosiloxane block copolymer. These forms include fibers, mats, whiskers, and any other form which is capable of reinforcing the random block copolymer.

The quantity of the reinforcing aromatic amide polymer is any quantity which effectively increases the modulus of the polycarbonate diorganosiloxane random block copolymer composite. Generally, from about 0.5% to about 85 weight % of the reinforcing material, based upon the polycarbonate diorganosiloxane random block copolymer present plus the aromatic amide polymer in the composition can be employed. Preferably from about 10 to about 65 weight % of the reinforcing material can be employed. The reinforcing material can be incorporated into the composition in any of the known methods. The fibers can be added to powdered polycarbonate polydiorganosiloxane random block copolymer, mixed and then extruded together. The reinforcing material can be in mat form and the powdered polycarbonate polydiorganosiloxane random block copolymer added so as to make a sandwich of the mat. The mat can be present in a mold and the molten polycarbonate diorganosiloxane block copolymer can be added thereto. The only significant factor is that the polymeric aromatic amide reinforces the block copolymer.

It has been surprisingly found that the reinforced polycarbonate diorganosiloxane block copolymer exhibits excellent impact resistance upon undergoing the falling dart test under ASTM D3029 method G standards. These results differ substantially from the polymeric aromatic amide reinforced polycarbonate itself wherein significant impact strength is lost. Alone both polycarbonate and KEVLAR ® resin materials are both highly impact resistant. Below are control experiments utilizing reinforced polycarbonate and experiments utilizing the composition of this invention.

EXAMPLE 1

Composites of woven mat type KEVLAR ® fabric 328 obtained from HiPro-Form-Fabrics, Inc., and specific resins were prepared by interlaying the resin between and on the fabric surfaces in a 6"×6" compression mold. The compression mold platten temperature was set at 600° F. Five separate KEVLAR ® fabric mats were used in an individual mold with the resin interspersed thereon and between. The matrix resin was varied—LEXAN ® 140 polycarbonate resin and COPEL ® LR resin. The mat content was 60 weight percent of the mat plus resin weight. The impact resistance of each composite was measured as the point of showing physical surface damage, i.e. mat yielding as indicated by a tearing of the fibrous structure on the reverse side after impacting.

The impact resistance of the pure resins was the point where the falling dart tears the nipple formed on impact.

carbonate greatly increased the impact resistance of the reinforced composite. KEVLAR ® fiber reinforced polycarbonate has relatively poor normalized impact resistance as shown by the first experiment. However, KEVLAR ® fiber reinforced COPEL ® resin demonstrated excellent normalized resistance to impact in comparison to the reinforced polycarbonate. When using a six mat reinforced COPEL ® resin, the normalized impact resistance was actually better than the non-reinforced COPEL ® resin.

What is claimed is:

1. A composition comprising a polycarbonate-polydiorganosiloxane block copolymer reinforced with an effective reinforcing amount of a polymeric aromatic amide in a physical form which achieves reinforcement.

2. The composition in accordance with claim 1 wherein the polymeric aromatic amide is in the form of a fiber, mat or whisker.

3. The composition in accordance with claim 1 wherein the polymeric aromatic amide is from about 0.5 to about 85 weight percent of the block copolymer and the polymeric aromatic amide.

4. The composition of claim 1 in the form of a sheet.

5. The composition of claim 1 compression molded into an article.

| RESIN | NUMBER OF KEVLAR ® RESIN MATS | IMPACT RESISTANCE IN-LB | NORMALIZED IMPACT RESISTANCE IN-LB/INCH THICKNESS OF COMPOSITE[3] |
|---|---|---|---|
| Polycarbonate[1] | 5 | 24 | 571 |
| LR[2] | 5 | 72 | 1358 |
| LR[2] | 6 | 168 | 2543 |
| LR[2]* | 0 | 180 | 1428 |
| Polycarbonate[1] | 0 | >360 | >2880 |

[1] LEXAN ® 140 resin obtained from General Electric Company.
[2] COPEL ® resin obtained from General Electric Company random block copolymer of dimethyl siloxane, 43 wt. percent and bisphenol-A polycarbonate, 57 wt. %.
[3] Impact resistance/thickness of sample
*Control of 100% LR, .126 inch thick As is readily observed, the use of a random block copolymer of dimethylsiloxane with bisphenol-A poly-